US009605796B2

(12) United States Patent
Yamamoto et al.

(10) Patent No.: US 9,605,796 B2
(45) Date of Patent: Mar. 28, 2017

(54) POSTURE HOLDING APPARATUS

(71) Applicant: FUMOTO GIKEN CO., LTD., Miura-gun, Kanagawa-ken (JP)

(72) Inventors: Ryouhei Yamamoto, Miura-gun (JP); Yuho Yamamoto, Miura-gun (JP); Naoyuki Yamamoto, Miura-gun (JP)

(73) Assignee: FUMOTO GIKEN CO., LTD., Miura-gun (JP)

( * ) Notice: Subject to any disclaimer, the term of this patent is extended or adjusted under 35 U.S.C. 154(b) by 28 days.

(21) Appl. No.: 13/941,217

(22) Filed: Jul. 12, 2013

(65) Prior Publication Data
US 2014/0014806 A1    Jan. 16, 2014

(30) Foreign Application Priority Data

Jul. 13, 2012  (JP) ................. 2012-158168
Nov. 9, 2012  (JP) ................. 2012-247949

(51) Int. Cl.
| F16M 13/00 | (2006.01) |
| G01M 1/12 | (2006.01) |
| A47C 31/12 | (2006.01) |
| A47C 1/032 | (2006.01) |

(52) U.S. Cl.
CPC ......... *F16M 13/00* (2013.01); *A47C 1/03255* (2013.01); *A47C 1/03266* (2013.01); *A47C 1/03272* (2013.01); *A47C 1/03294* (2013.01); *A47C 31/126* (2013.01); *G01M 1/12* (2013.01)

(58) Field of Classification Search
USPC ................................. 297/316, 340
See application file for complete search history.

(56) References Cited

U.S. PATENT DOCUMENTS

| 4,717,164 A * | 1/1988 | Levavi ................... 280/259 |
| 4,830,432 A | 5/1989 | Fuhrmann et al. |
| 5,080,318 A * | 1/1992 | Takamatsu et al. .......... 248/598 |
| 7,401,858 B2 * | 7/2008 | Lee ................... 297/383 |
| 7,992,937 B2 * | 8/2011 | Plikat et al. ............... 297/300.2 |
| 2008/0036252 A1 * | 2/2008 | Breed ................... 297/217.2 |
| 2012/0001463 A1 * | 1/2012 | Breed et al. ............... 297/217.2 |

FOREIGN PATENT DOCUMENTS

| DE | 40 07 179 A1 | 9/1991 |
| JP | 2006-181101 A | 7/2006 |
| JP | 3136349 U | 10/2007 |

* cited by examiner

*Primary Examiner* — David E Allred
(74) *Attorney, Agent, or Firm* — Masuvalley & Partners

(57) ABSTRACT

A posture holding apparatus including, a base onto which a substance is placed, a supporting member being attached onto the base so that the supporting member swings between a standby state and an active state, and a swinging support member having a returning force for returning the supporting member to the standby state, wherein the swinging support member is structured by a swinging member, a biasing member for applying a biasing force to the swinging member to the standby state, a liquid pressure output member for outputting liquid pressure in response to a weight of the substance, and a displacement amount adjusting member, with which a point of action of the biasing force applied from the biasing member to the supporting member is moved in response to the liquid pressure such that a distance from the pivot to the point of action changes.

6 Claims, 15 Drawing Sheets

POSTURE HOLDING APPARATUS

TECHNICAL FIELD

The present invention relates to a posture holding apparatus for maintaining a posture by holding a substance placed on a base from the side.

BACKGROUND ART

Conventionally, when loading and transporting a package or the like, or when loading and transporting a placed object, or storing it, etc., the transported goods or the stored goods are placed on a pedestal or in a container as mentioned in the Patent Document 1, for example.

PRIOR ART DOCUMENTS

Patent Documents

Patent Document 1: Utility model registration No. 3136349
Patent Document 2: Japanese Unexamined Patent Publication No. 2006-181101

Problems to be Solved by the Invention

However, some objects placed on such pedestals or the like shift the center of gravity while in the mounted state. For example, in the case of animals or humans, the center of gravity shifts every time they change their postures, and therefore, it is not possible to hold them stably on the pedestal at all times. Further, in the case of a water tank or the like, the center of gravity shifts every time waves occur in water due to shaking or vibration during transportation.

In such cases, in order to prevent an object from falling off the pedestal due to the shifting of the center of gravity, a supporting member is disposed in the circumference of the pedestal for supporting the fallen object. Conventionally, such a supporting member has a configuration such as a railing or a frame disposed in the circumference, or a configuration using an elastic member that deforms by absorbing the impact and gently pushes back the object by a restoring force according to the amount of deformation in order to avoid damage to the fallen object.

However, the structure of the conventional supporting members had a drawback, namely, when the weight of a placed object is increased, a restoration force of the elastic member becomes inadequate, and a holding force for maintaining the placed object in an expected posture becomes insufficient, making it impossible to achieve satisfactory posture-maintaining effect. On the other hand, if a restoring force of the elastic member is enhanced in order to improve the holding force for a heavy object, there was a drawback such that when a lightweight object is inclined onto the supporting member, a sufficient impact absorbing effect was not achieved because the elastic member was unable to deform sufficiently.

An object of the present invention is to provide a posture holding apparatus in an apparatus for maintaining the posture of a placed object, the posture holding apparatus can maintain a sufficient impact absorbing effect for objects of a wide range of loads from lightweight to heavy weight, and restore the objects to an original posture.

Means to Solve the Problems

The present invention that solves the above-mentioned problems has the following configuration.
(1) A posture holding apparatus including:
   a base onto which a substance is placed;
   a supporting member which is attached onto the base so that the supporting member freely swings centering on a pivot between a standby state where the supporting member does not support the substance and an active state where the supporting member supports the substance in an inclination state, the supporting member being positioned on a side of the base; and
   a swinging support member having a returning force for returning the supporting member to the standby state when the supporting member is inclined;
   wherein the swinging support member is structured by
   a swinging member that is supported such that it can swing freely and that swings in conjunction with the supporting member,
   a biasing member for applying a biasing force to the swinging member in a direction of returning the supporting member to the standby state,
   a liquid pressure output member for outputting liquid pressure in response to a weight of the substance placed on the base, the liquid pressure output member being positioned under the base; and
   a displacement amount adjusting member, with which a point of action of the biasing force applied from the biasing member to the supporting member is moved in response to the liquid pressure outputted from the liquid pressure output member such that a distance from the pivot to the point of action changes.
(2) The posture holding apparatus of the above-mentioned (1) including:
   a connecting member that bridges between the swinging member and the supporting member, and synchronizes the swinging member and the supporting member,
   wherein the operating point is a connection shaft for connecting the connecting member and the swinging member.
(3) The posture holding apparatus of the above-mentioned (2), wherein the moving amount adjusting member includes
   a moving member capable of reciprocating to change a distance between the connecting part connecting the connecting member and the swinging member, and a support shaft of the swinging member, and
   an actuator for adjusting a displacement amount of the moving member in response to the liquid pressure outputted from the liquid pressure output member.
(4) The posture holding apparatus according to any one of the above-mentioned (1) through (3) further including:
   a pressure transmission member for transmitting the liquid pressure from the liquid pressure output member to the displacement amount adjusting member; and
   a disabling reverse transmission member provided in the pressure transmission member, the disabling reverse transmission member enabling transmission of pressure of the pressure transmission member in a direction from the liquid pressure outputting member to the displacement amount adjusting member and disabling transmission from the displacement amount adjusting member to the liquid pressure outputting member.
(5) The posture holding apparatus of the above-mentioned (4), further including a release member for releasing regulations of a pressure transmission direction of the disabling reverse transmission member when the supporting member returns to the standby state.

(6) The posture holding apparatus according to any one of the above-mentioned (3) through (5), wherein the connecting part has a connection shaft that is inserted through a long hole formed in the swinging member and that is capable of moving along the long hole, the long hole having formed along a radiating direction relative to a oscillation shaft.

(7) The posture holding apparatus according to the above-mentioned (6), further including:
a positioning member provided with a positioning hole formed at a position corresponding to a position of the long hole, the positioning member being provided over the swinging member,
a plurality of recessed parts with which the connection shaft engages, the recessed parts being provided along a movement direction of the connection shaft in a circumference of the positioning hole, and
a pressing biasing member for biasing the positioning member such that the recessed parts is pressed against the connection shaft.

Effect of the Invention

According to the invention described in (1), a biasing force of the elastic member against the supporting member, which is provided for maintaining the posture of the object, can be made to act as a returning force in accordance with a degree of inclination of the supporting member, and the restoring force can be adjusted in accordance with the weight of the placed object. As a result, it is possible to achieve an adequate posture-holding force for a wide range of loads from lightweight to heavy weight while maintaining an impact absorbing effect that is appropriate according to the load without need to separately provide a means for adjusting the holding force.

According to the invention described in (2), the swinging member oscillates in synchronization with the oscillation of the supporting member due to the connecting member. Because the connecting part of the connecting member and the swinging member becomes the point of action, by moving the connecting part, it is possible to move the point of action of the biasing force applied on the supporting member by the biasing member.

According to the invention described in (3), the actuator converts a liquid pressure into a displacement amount and moves the moving member. Based on the displacement of this moving member, the connecting part can be surely moved.

According to the invention described in (4), because the disabling reverse transmission member prevents a counter flow of the pressure transmission medium, a holding force can surely be adjusted in accordance with the degree of inclination of the supporting member.

According to the invention described in (5), when the supporting member is returned to the standby state, the restriction in the pressure transmission direction by the disabling reverse transmission member is released, and therefore, even if the weight of the placed object changes after returning, adjustment of the biasing force can be done each time in accordance with the changed weight.

According to the invention described in (6), as it is possible to move the connecting part along the long hole, a movement of the connecting part can surely be guided. Moreover, because the long holes are formed along a radiating direction with respect to the oscillating shaft, a distance between the point of action of the biasing force and the shaft fulcrum can be adjusted in the direction of changing the return force.

According to the invention described in (7), positioning of the connection shaft inside the long hole is possible with the help of a positioning hole that is provided so as to overlap with the long hole, and therefore, movement of the connection shaft during the swinging movement of the supporting member is prevented, and any fluctuation in the returning force acting on the supporting member is suppressed.

DETAILED DESCRIPTION OF PREFERRED EMBODIMENTS

Figure 1:
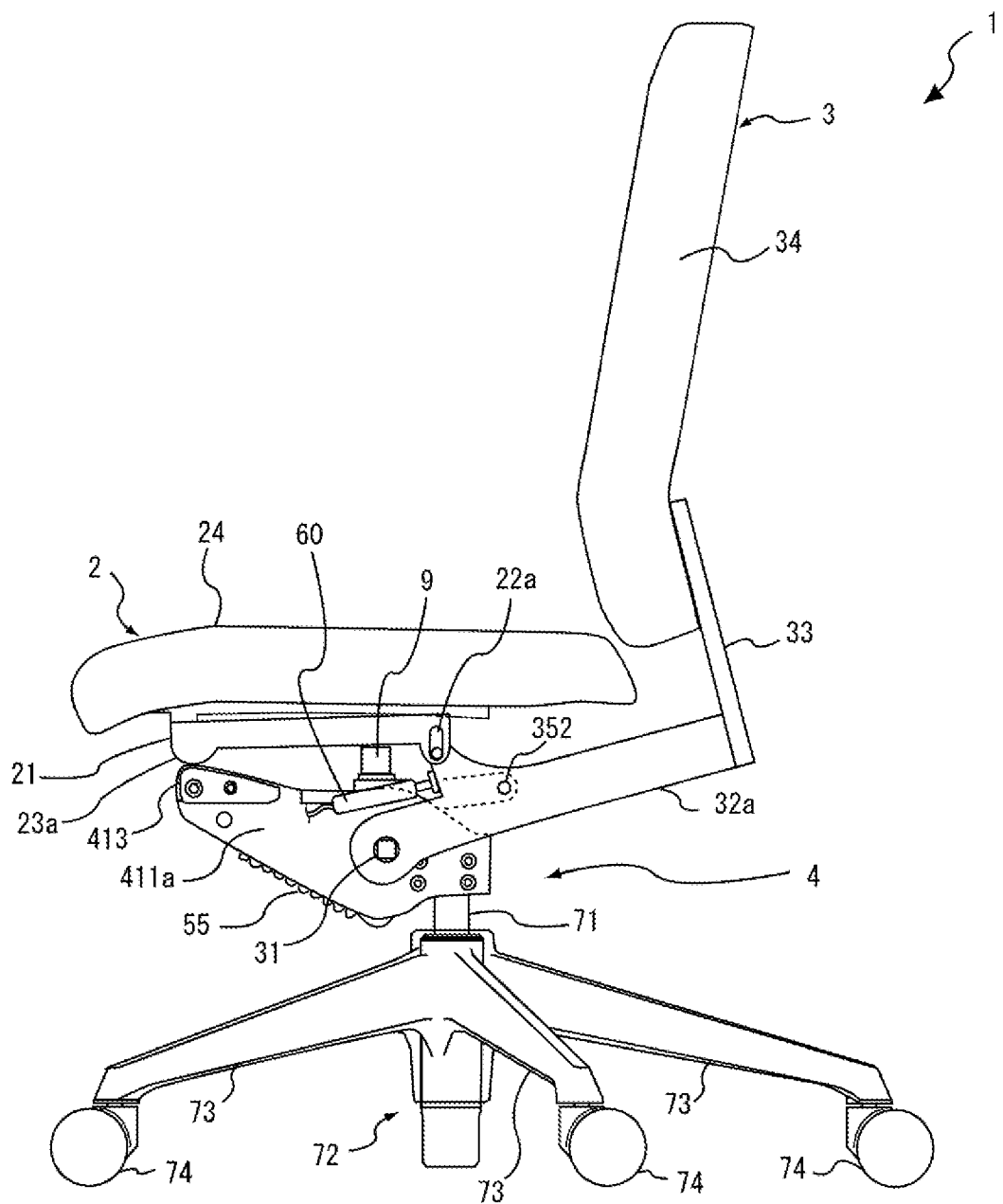
FIG. 1 is an overall side view of the posture holding apparatus of the present invention.

A preferred embodiment of the present invention will be explained in detail below with reference to the accompanying figures. FIG. 1 is an overall side view of the posture holding apparatus 1 of the present invention.

The posture holding apparatus 1 that holds a placed object is provided with a base 2, a supporting member 3 disposed on a side of the base 2, and a swinging support member 4 that supports the supporting member 3 with respect to the base 2 such that it can swing freely.

The swinging support member is rotatably supported on a pedestal 72. The pedestal 72 can have any configuration, and for example, as shown in FIG. 1, it may be configured from a plurality of legs 73 disposed radially from the base end of a strut 71, and casters 74 provided at the tip of the legs 73.

Figure 2:
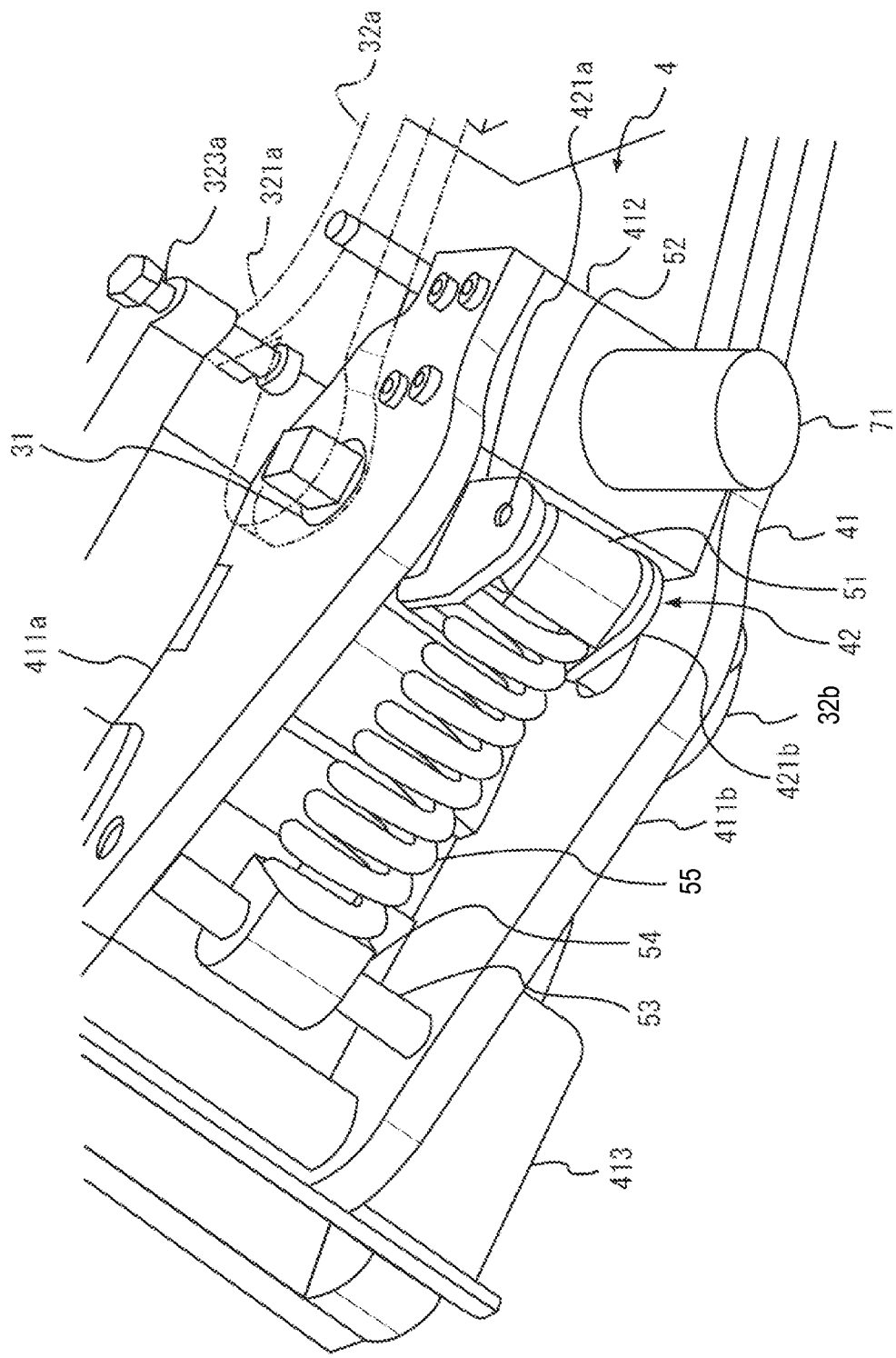
FIG. 2 is an overall perspective view from the underside of the swinging support member.

As shown in FIG. 2, the substrate 41 of the swinging supporting member 4 is rotatably supported at the upper end of the strut 71. The substrate 41 is provided with a base material 412 supported by the strut 71, and a pair of side members 411a and 411b that are placed in parallel with each other so as to sandwich the base material 412. In the tip section of the substrate 41, a receiving member 413 formed between the side members 411a and 411b is provided, and its upper surface functions as a receiving surface 413s.

As shown in FIG. 2, an oscillating shaft 31 pivotally supporting the supporting member 3 so as to swing freely is inserted between the side members 411a and 411b in a freely-rotatable manner. Both ends of the oscillating shaft 31 protrude toward the outside of the side members 411a and 411b, and the respective ends are connected and fixed to a tip of the swinging support members 32a and 32b that configure the supporting member 3.

Inside the side members 411a and 411b, a swinging member 42 is supported on the oscillating shaft 31 so as to freely rotate with respect to the oscillating shaft 31. The swinging member 42 is provided with an end surface part 422 configured from a recess-shaped plate member, and a pair of swing side parts 421a and 421b that are connected to the respective ends of the end surface part 422. In addition to inserting the above-mentioned oscillating shaft 31 between the pair of facing swing side parts 421a and 421b, a spring rest 51 is rotatably supported at one end (lower end) via a shaft 52.

Figure 3:
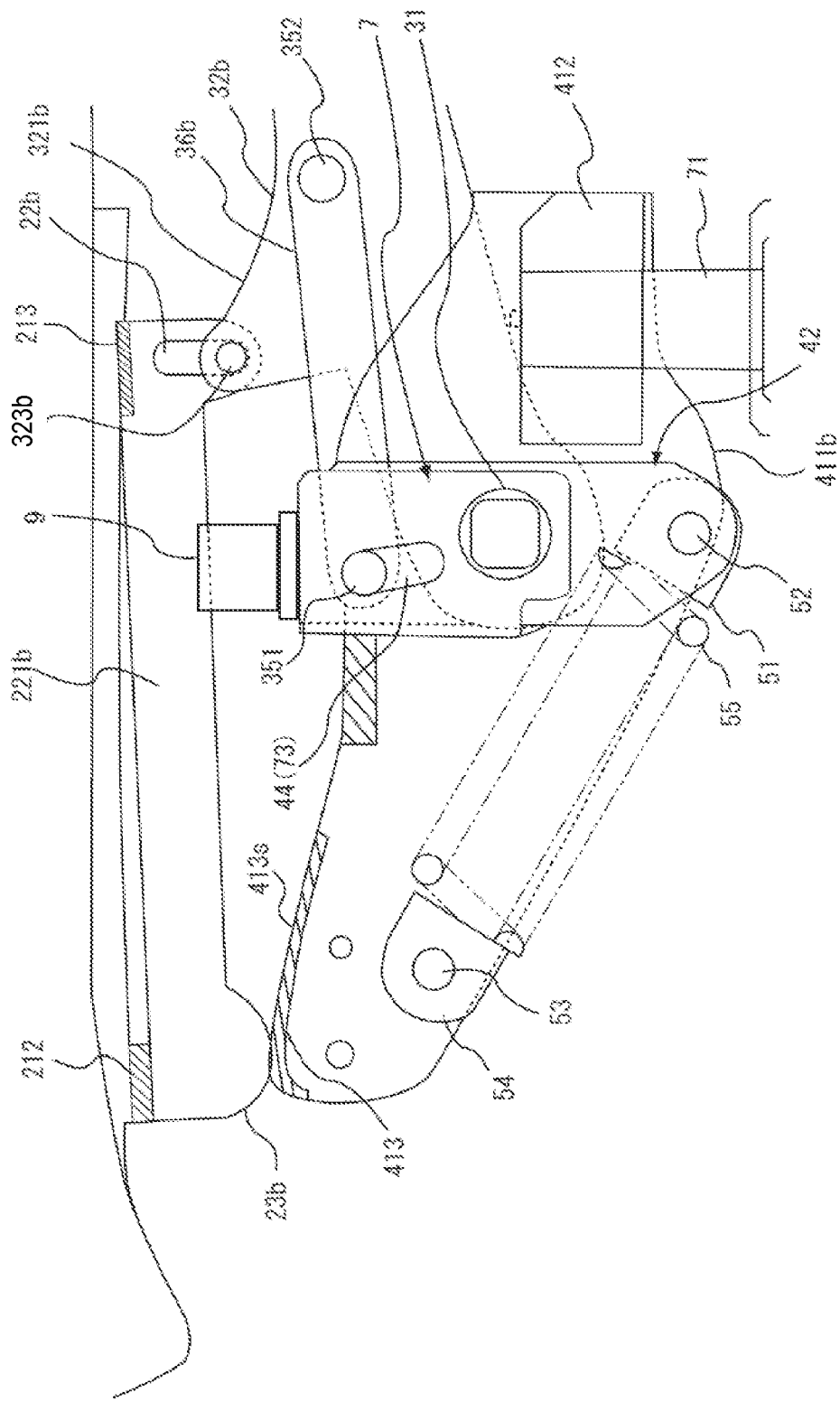
FIG. 3 is a cross-sectional side diagram of the swinging support member.

As shown in FIG. 2 and FIG. 3, inside the side members 411a and 411b, near the tip section of them, a spring rest 54 is rotatably supported via the shaft 53, and a compression spring 55 is inserted between the spring rest 54 and the spring rest 51 as a biasing member.

Figure 4:
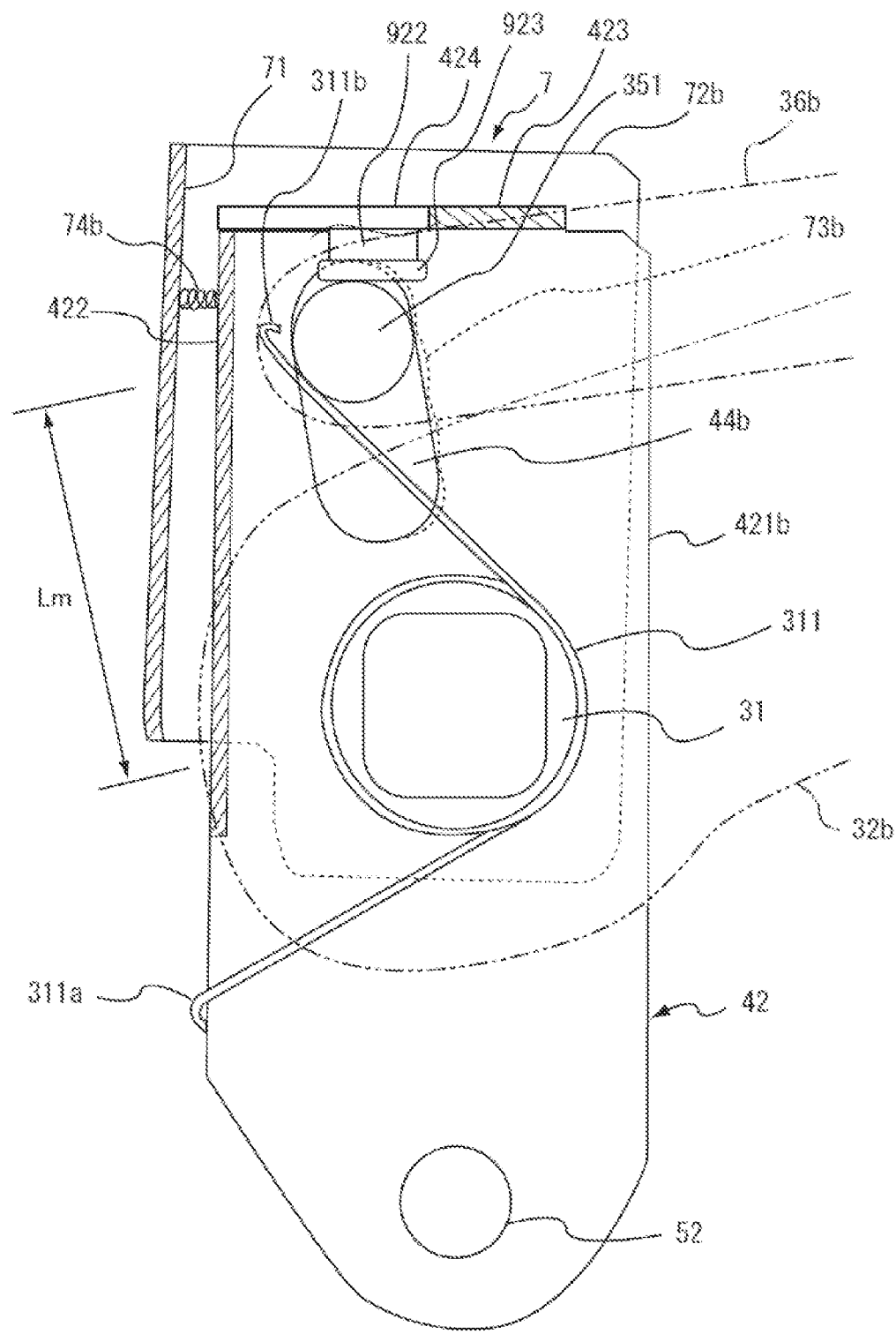
FIG. 4 is a cross-sectional side diagram of the swinging member.
Figure 5:
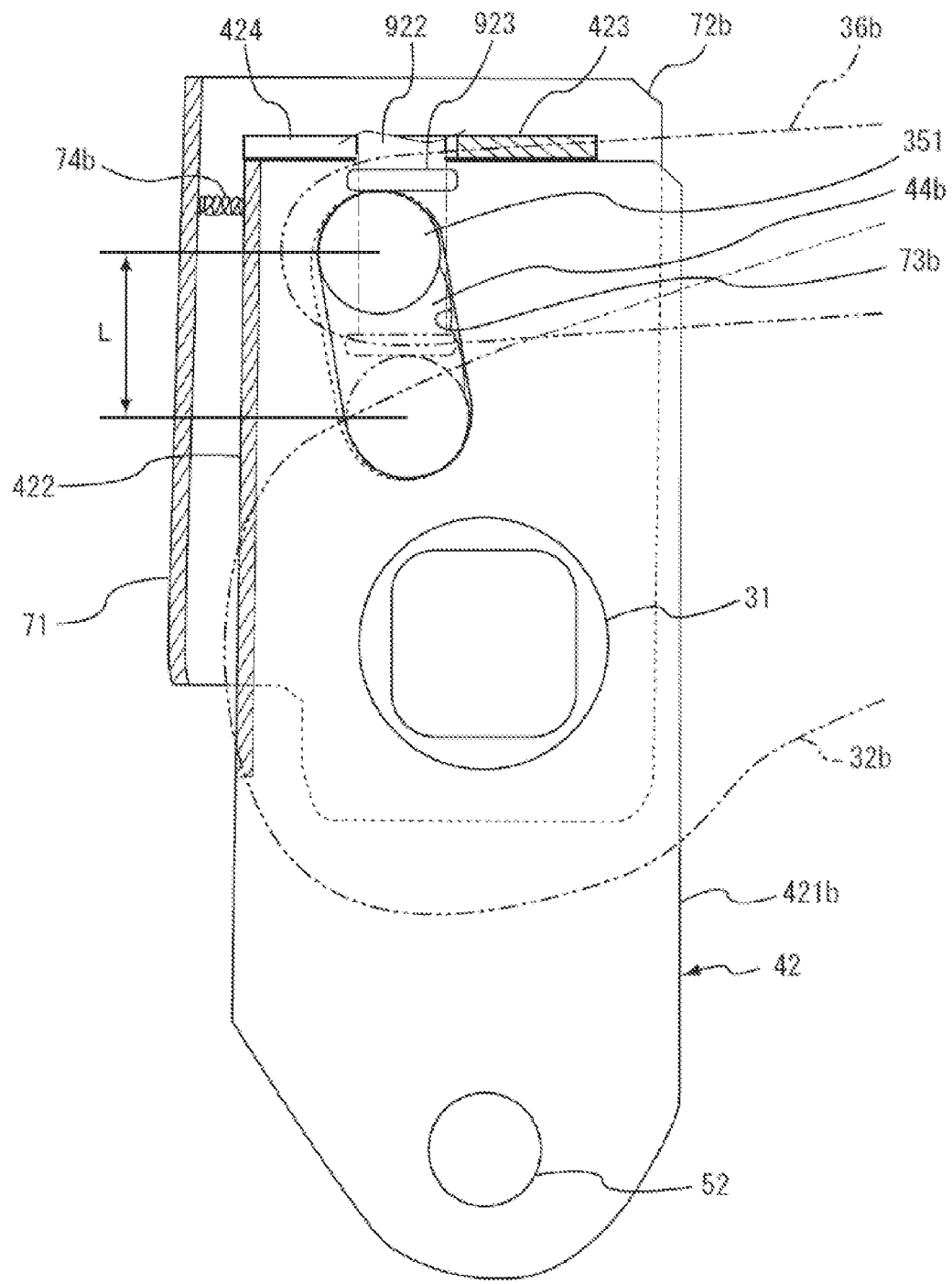
FIG. 5 is a cross-sectional side diagram of the swinging member.

This compression spring 55 constantly applies a biasing force against the swinging member 42, and generates a force for returning the supporting member 3 toward the standby state. As shown in FIG. 4 and FIG. 5, on the opposite side of the shaft 52 across the oscillating shaft 31, long holes 44a and 44b of identical size and identical shape are formed at a position opposite to swing side parts 421a and 421b respectively. A connection shaft 351 is inserted in the long holes 44a and 44b, and the respective ends of the connection shaft 351 are connected with an end of the connecting members 36a and 36b.

A positioning member 7 is disposed on the outside of the swinging member 42 so as to overlap with the end surface part 422 and the outside of the swing side parts 421a and 421b. The positioning member 7 includes a front surface part 71 configured from a recess-shaped plate member, and a pair of side surface parts 72a and 72b connected to the respective ends of the front surface part 71. An oscillating shaft 31 described above is inserted between the pair of facing side surface parts 72a and 72b. The positioning member 7 is pivotably supported on the oscillating shaft 31. That is, the swinging support members 32a and 32b, the swinging member 42, and the positioning member 7 are pivotally supported by the same oscillating shaft 31, and supported such that they can swing mutually independently.

Figure 6:
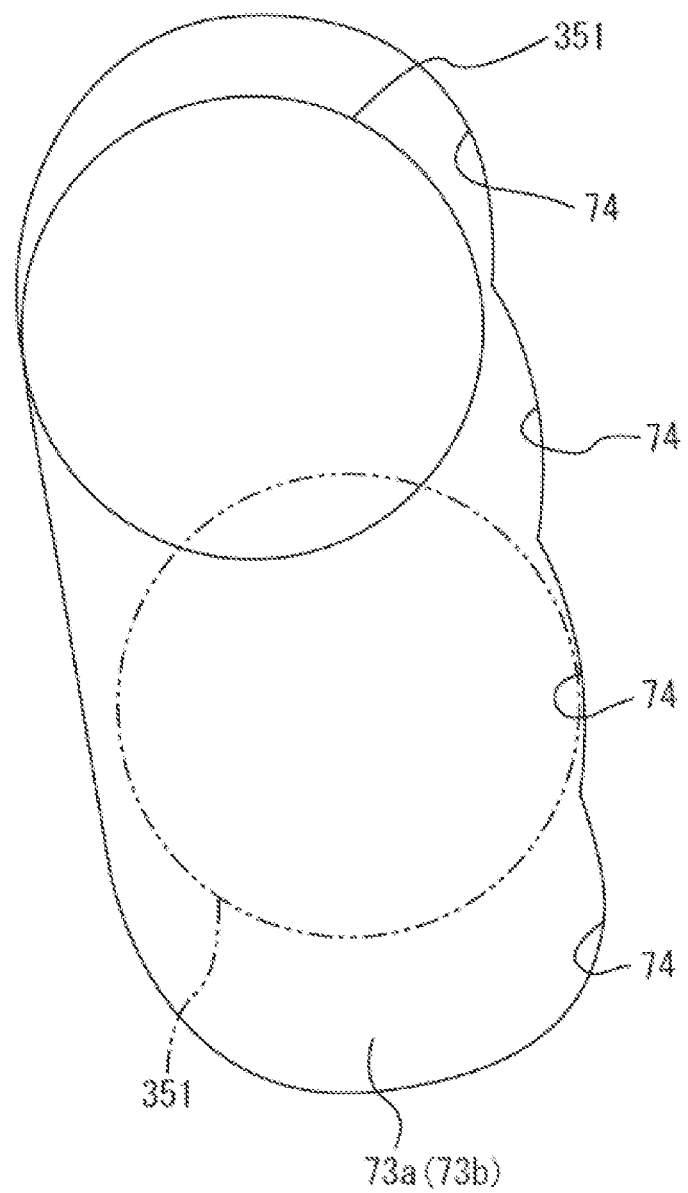
FIG. 6 is an enlarged view of the long hole provided in the positioning member.
Figure 7:
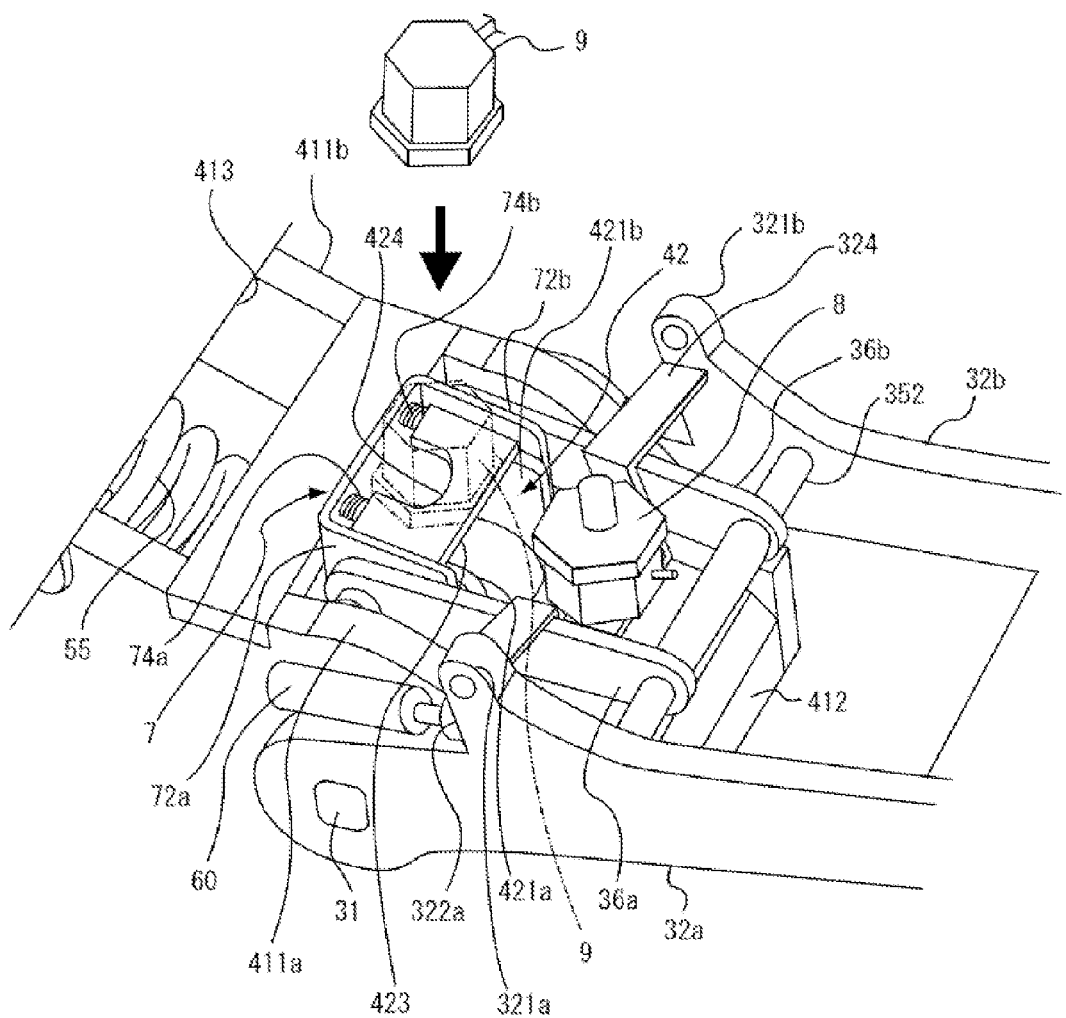
FIG. 7 is an overall perspective view from the top of the swinging support member.

At the position where the side surface parts 72a and 72b face each other, the long holes 73a and 73b of identical size and shape are provided at a position overlapping with the long holes 44a and 44b described above. As shown in FIG. 4 through FIG. 6, in the inside of the long holes 73a and 73b, a plurality of recess parts 74 are formed in the direction of movement of the connection shaft 351. As shown in FIG. 7, the compression springs 74a and 74b are inserted between the front surface part 71 and the end surface part 422, and the positioning member 7 is biased in the direction in which the recessed part 74 is pressed against the connection shaft 351. With such a configuration, when the connection shaft 351 traverses inside the long holes 44a and 44b and the long holes 73a and 73b, every time the connection shaft 351 climbs over a projection between the recessed parts 74, the positioning member 7 oscillates around the oscillating shaft 31 and the connection shaft 351 is configured to stop at any of the recessed parts 74, and consequently, the connection shaft 351 is positioned inside the long holes 44a and 44b. Moreover, in the inside of the swing side parts 421a and 421b, a coil spring 311 is wound around the oscillating shaft 31. A fixed end 311a of the coil spring 311 is fixed to the lower end side of the swing side part 331b, and a working end 311b of the coil spring 311 abuts the connection shaft 351. The connection shaft 351 is biased in a direction away from the oscillating shaft 31 by the working end 311b of the coil spring 311. The coil spring functions as a return member to return the actuator 9 to the initial state.

The long holes 44a and 44b are formed along a radiation direction around the oscillating shaft 31, and the distance Lm between the connection shaft 351 and the oscillating shaft 31 changes by a movement of the connection shaft 351 in the inside of the long holes 44a and 44b.

A base member 423 is installed at the upper end of the swinging member 42. The base member 423 is provided with a moving member insertion part 424, and a displacement amount actuator 9 is fixed on the base member 423.

Figure 8:
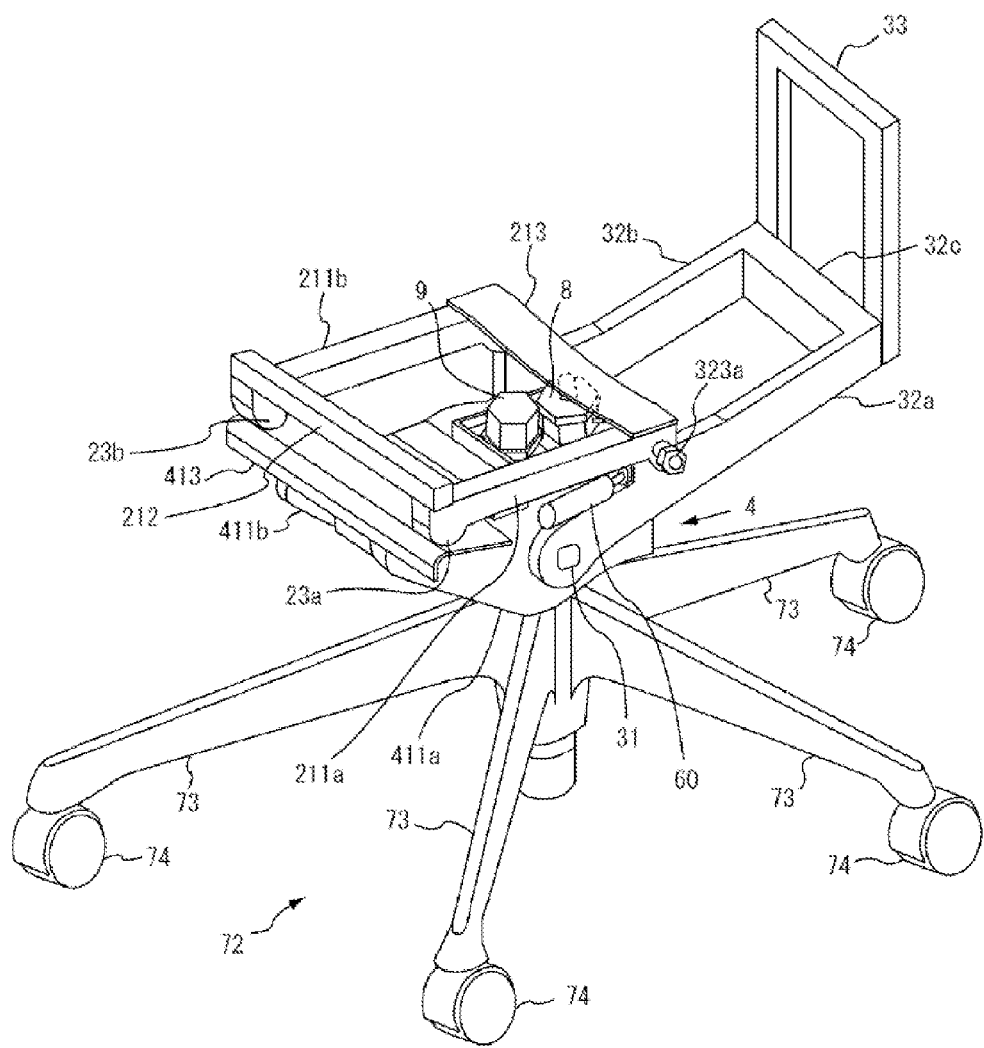
FIG. 8 is an overall perspective view of the posture holding apparatus without the placing member.

As shown in FIG. 1 and FIG. 8, the supporting member 3 includes: one pair of swinging support members 32a and 32b; a beam 32c connecting the base end sections of the swinging support members 32a and 32b; a posture holding supporting part 33 erected on the beam 32c; and a holding contact part 34 for holding the posture by contacting the placed object,
and the holding contact part 34 is fixed to the posture holding supporting part 33.

As shown in FIG. 7, the other ends of the connecting members 36a and 36b are connected to the swinging support members 32a and 32b via a rear section connecting shaft 352. In the swinging support members 32a and 32b, between the oscillating shaft 31 and the rear section connecting shaft 352, the connecting parts 321a and 321b that project in the upward direction are formed respectively, and the connecting shafts 323a and 323b are inserted respectively in the tip section of the connecting parts 321a and 321b.

Between the swinging support members 32a and 32b, a beam 324 is provided in the vicinity of the connecting parts 321a and 321b, and a pressure actuator 8 is fixed as a liquid pressure outputting member on the beam 324.

As shown in FIG. 2, FIG. 3 and FIG. 8, each of the connecting shafts 323a and 323b is inserted through the long holes 22a and 22b provided in the supporting frame 21 of the base 2.

The base 2 includes a placing member 24 on which an object can be placed directly, and a supporting frame 21 that supports the placing member 24 from the lower side, the supporting frame 24 being located in the lower side of the placing member 24. The supporting frame 21 includes: a matched pair of slide members 211a and 211b disposed at left and right in parallel with the swinging support members 32a and 32b; a connecting rod 212 connecting the tip end side of the slide members 211a and 211b; and a contact member 213 connecting the base end side of the slide members 211a and 211b. Slide contact parts 23a and 23b protruding in the downward direction are provided at the tip sections of the slide members 211a and 211b respectively, and the sliding contact parts 23a and 23b are mounted on the receiving surface 413s of the receiving member 413. The slide contact parts 23a and 23b slide in the rear direction on the receiving surface 413s together with the sliding movement of the base 2 in the rear direction.

Long holes 22a and 22b are formed in the vertical direction at each base end part of the slide members 211a and 211b respectively. When an object is placed on the base 2, the base 2 swings downward around the contact point of the slide contact parts 23a and 23b, and the long holes 22a and 22b sink downward. At the same time, the contact member 213 pushes down the piston rod 822 of the pressure actuator 8.

When the supporting member 3 inclines rearwards, the supporting frame 21 is pulled rearward through the long holes 22a and 22b according to the inclination of the swinging support members 32a and 32b, and the base 2 moves while the slide contact parts 23a and 23b slide over the receiving surface 413s.

Figure 9:
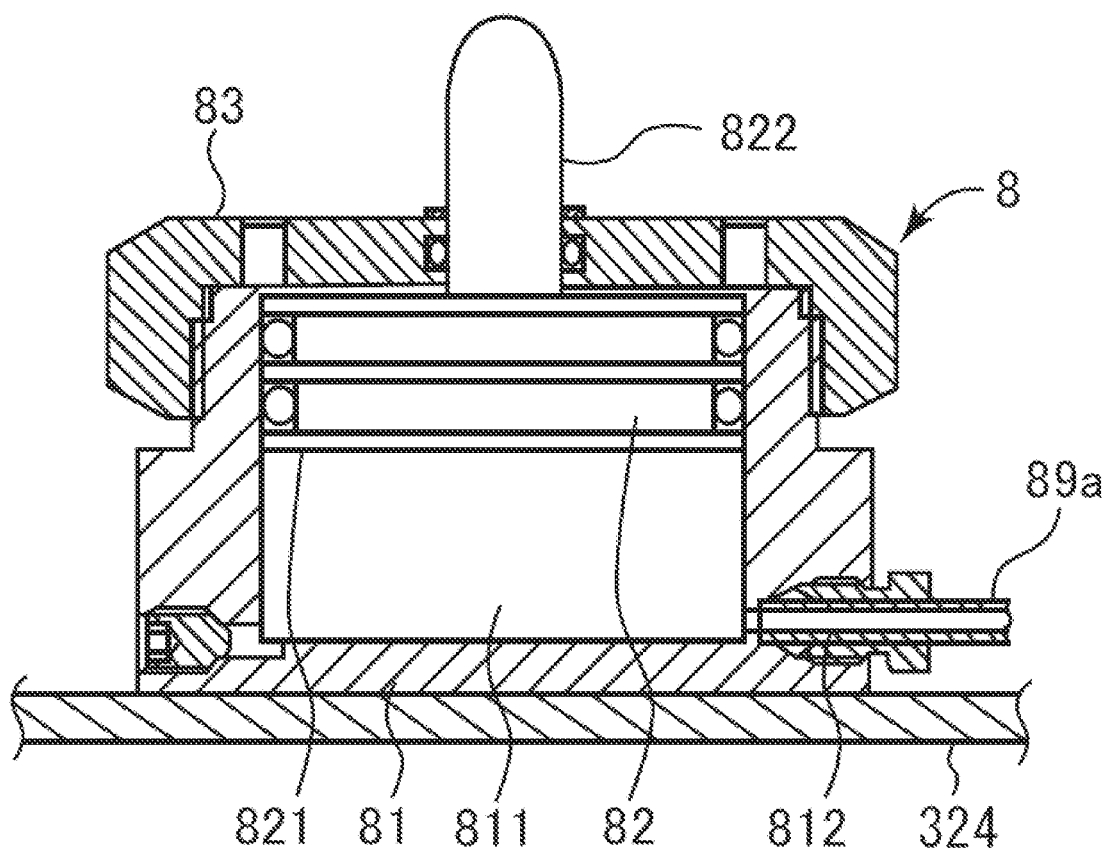
FIG. 9 is a cross-sectional rear view of the pressure actuator.

FIG. 9 is a cross-sectional side view of the pressure actuator 8. The pressure actuator 8 is a mechanism that outputs an inputted displacement amount as liquid pressure. The pressure actuator 8 acquires the weight of an object placed on the placing member 24 as a displacement amount of the piston rod, and outputs it as liquid pressure (hydraulic pressure).

The configuration of the pressure actuator 8 is described below. The pressure actuator 8 includes: a cylinder 81 fixed on the beam 324; a piston 82 reciprocatingly housed inside the cylinder 81; and a lid 83 for closing the opening of the cylinder 81. In a storage chamber 811 defined by the cylinder 81 and the piston head 821, oil is loaded as a pressure transmitting medium. When the piston head 821 moves within the cylinder 81, the volume of the storage chamber 811 changes, and commensurate with this change, the oil in the storage chamber 811 flows out/in through the opening 812 provided in the cylinder 81.

A piston rod 822 is connected to the piston head 821, and the piston rod 822 protrudes to the outside from the center of the lid 83. A tip of the piston rod 822 is of a spherical shape, and abuts the lower surface of the contact member 213.

Provided is a configuration wherein once an object is mounted onto the placing member 24, the contact member 213 pushes in the piston rod 822, and the piston head 821 moves in the direction to reduce the volume of the storage chamber 811, pushing the oil out through the opening 812. The pressure actuator 8 described above is not limited to one, and can be two or three or more. In case of providing a plurality of pressure actuators, it is preferable to dispose them uniformly with respect to the plane of the placing member 24.

The opening 812 is connected to one end of the flow path 89a. The other end of the flow path 89a is connected to a disabling reverse transmission member 6 (described later), and pressure outputted from the pressure actuator 8 is eventually fed to the cylinder chamber (pressure receiving chamber) 911 of the displacement amount actuator 9. Similarly, if there are multiple pressure actuators 8, a liquid pressure outputted from all of the pressure actuators 8 is aggregated in the cylinder chamber 91 of the displacement amount actuator 9. Further, the flow path 89a is made of a flexible resinous tube, and the flow paths 89c and 89d (described later) are also made of a flexible resinous tube.

Figure 10:
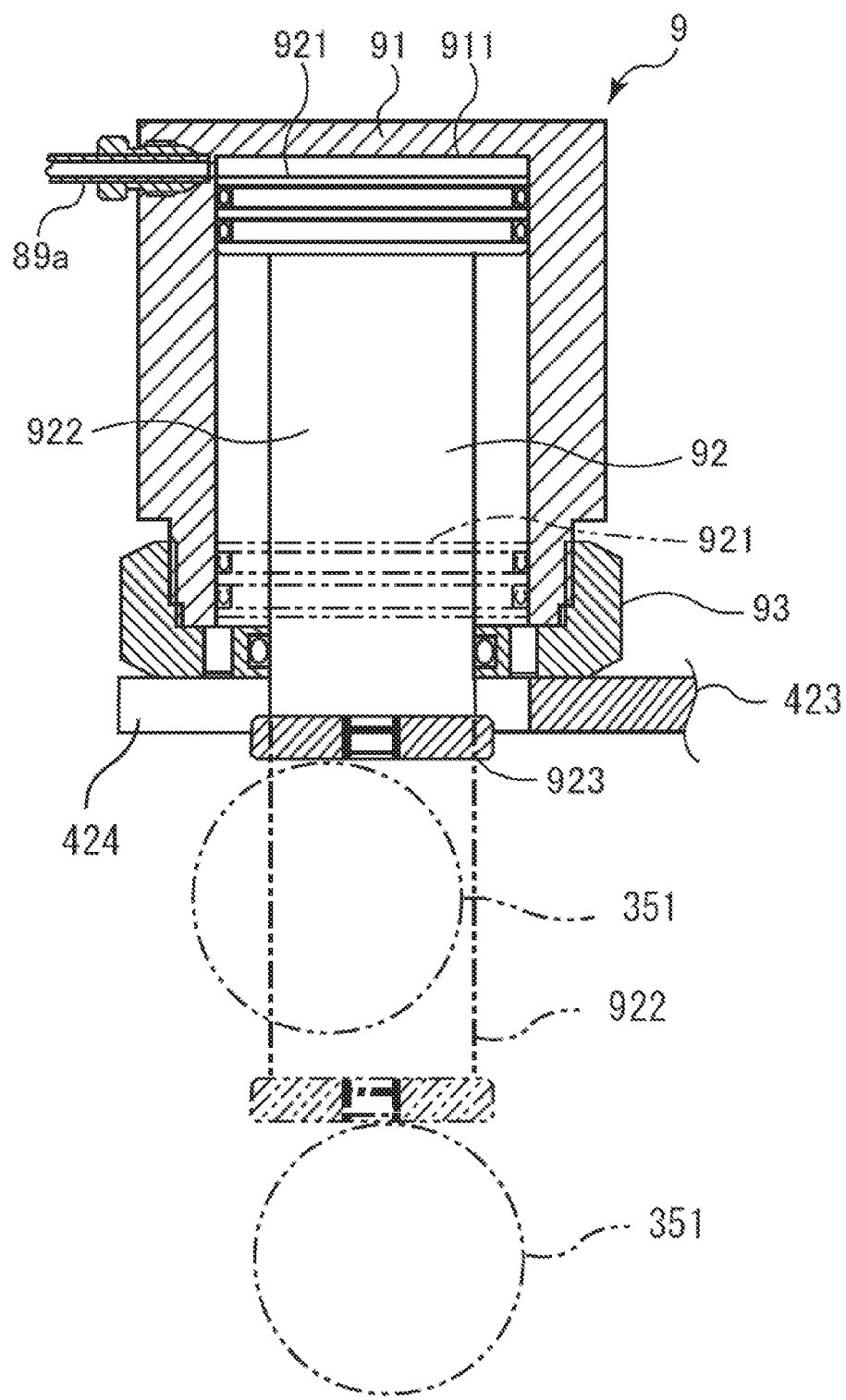
FIG. 10 is a cross-sectional side view of the displacement amount actuator.

Next, the configuration of the displacement amount actuator 9 is described. FIG. 10 is a cross-sectional side view of the actuator 9. The displacement amount actuator 9 is provided with a cylinder 91, a piston 92 housed inside the cylinder 91, and a lid 93 to cover an opening of the cylinder 91. The lid 93 is fixed on the base member 423, and the piston rod 922 of the piston 92 penetrates through the lid 93 and a moving member insertion part 424 of the base member 423 to protrude on the lower side of the base member 423.

The piston head 921 moves inside the cylinder 91, and a pressure receiving chamber 911 is defined by the inner wall of the cylinder 91 and the piston head 921. Connected to the cylinder chamber 911 is one end of the flow path 89c where oil pressure from the flow paths 89a and 89b merge. The pressure receiving chamber 911 receives oil pressure that is output from the pressure actuator 8, and the pressure received by the pressure receiving chamber 911 is converted into a displacement amount of piston rod 922.

A contact member 923 is provided at the tip of the piston rod 922, and the contact member 923 abuts the connection shaft 351. In such a configuration, when the piston rod 922 extends (downward), the contact member 923 moves (downward), and the connection shaft 351 also moves (downward) simultaneously. The connection shaft 351 moves inside the long hole 44 while moving. When an object is not placed, it is maintained in a state wherein the piston rod 922 is pushed back by the coiled spring 311 causing the volume of the pressure receiving chamber to become zero, and the oil is pushed back towards the pressure actuator 8.

Figure 11:
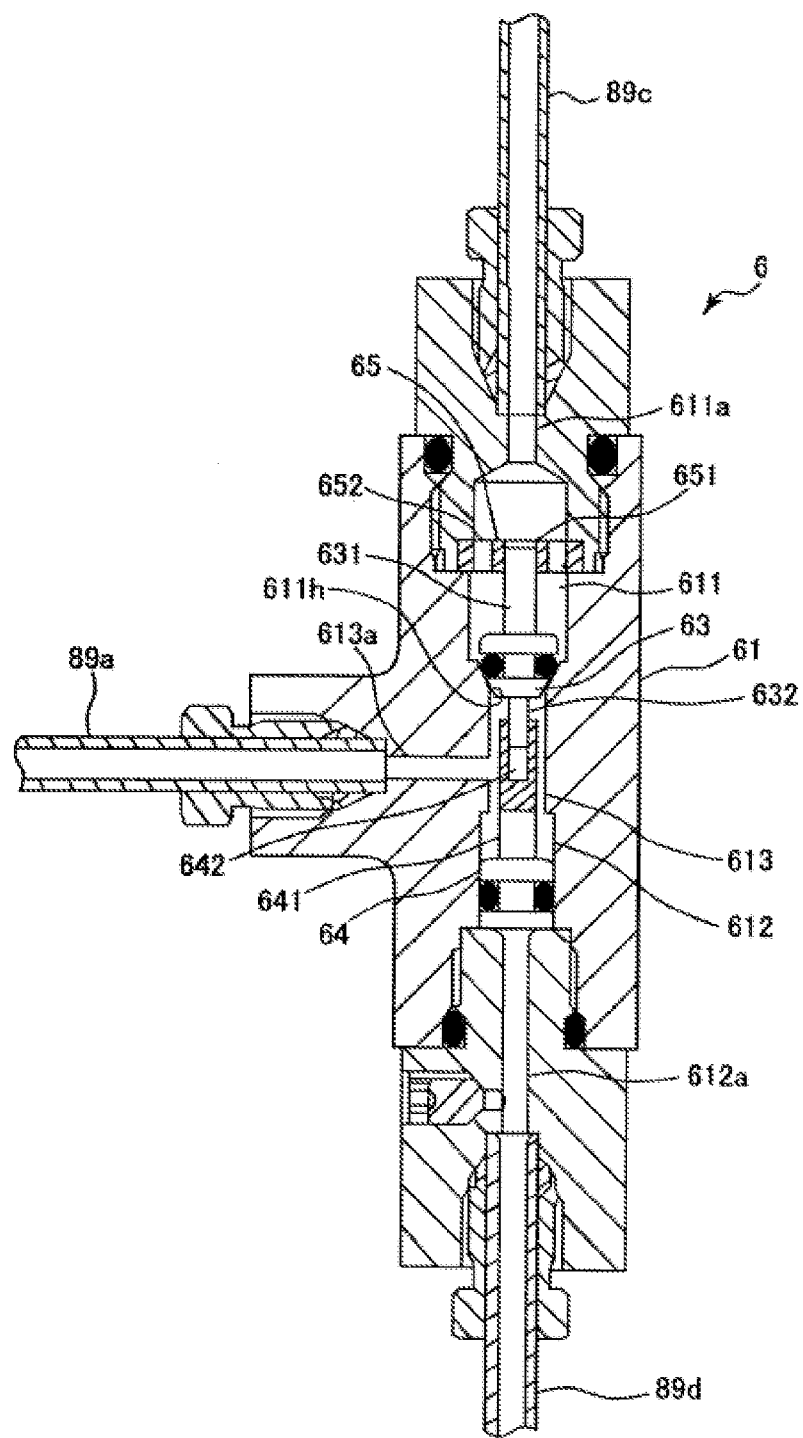
FIG. 11 is an overall cross-sectional side view of the disabling reverse transmission member (in a restricted state).
Figure 12:
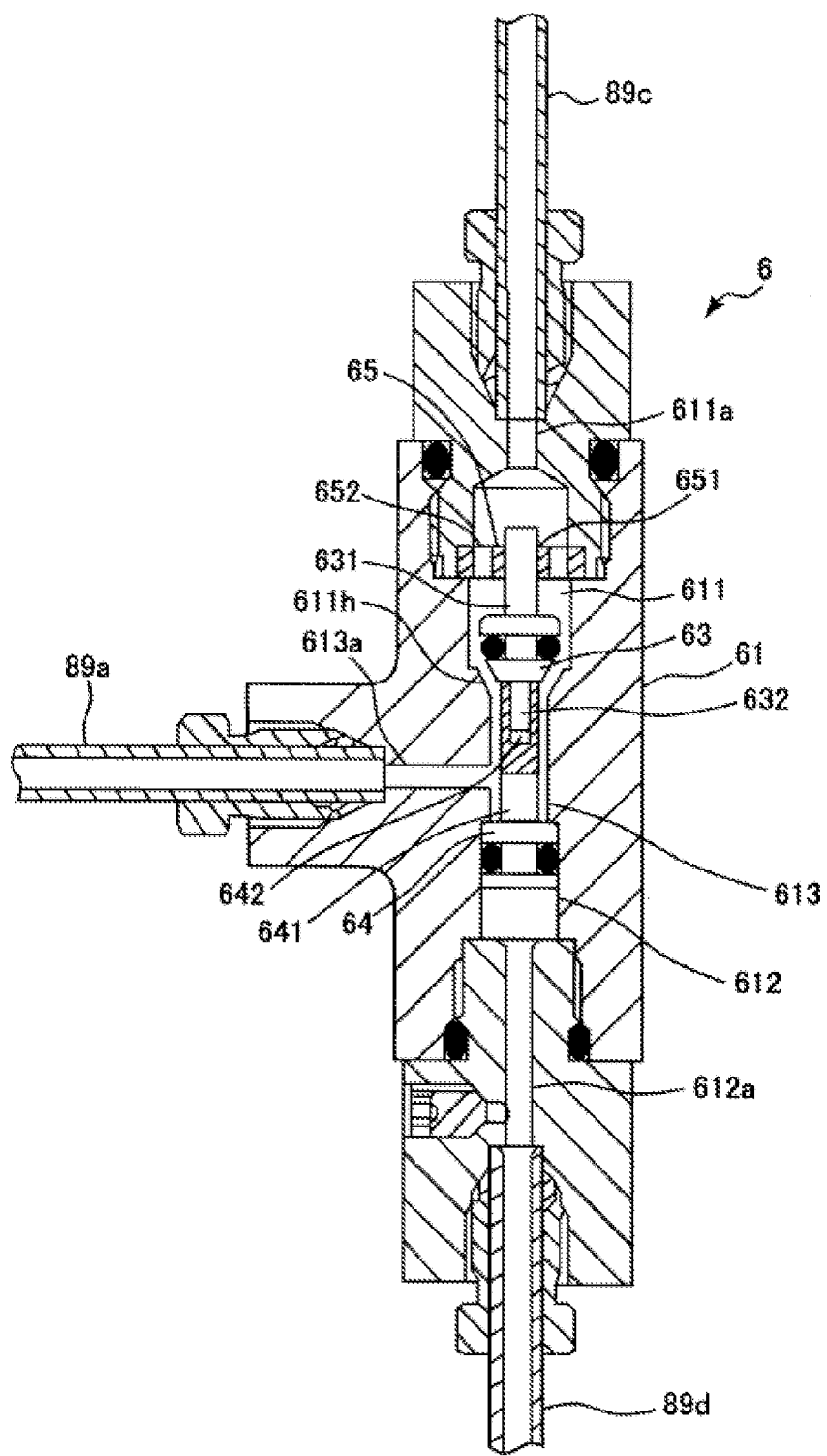
FIG. 12 is an overall cross-sectional side view of the disabling reverse transmission member (in a released state).

In the flow path connecting the pressure actuator 8 and the displacement amount actuator 9, a disabling reverse transmission member is provided to regulate the distribution of oil, which is a pressure transmitting medium. This disabling reverse transmission member allows a flow of the liquid from the pressure actuator 8 to the displacement amount actuator 9, and regulates a flow from the displacement amount actuator 9 to the pressure actuator 8 as a rule. The disabling reverse transmission member 6 is described below with reference to FIG. 11 and FIG. 12. The disabling reverse transmission member 6 is a check valve that allows the flow of oil, which is a pressure transmission medium, in only one direction, and prevents the flow in the reverse direction, and this check valve is provided with a release device for releasing the backflow restriction.

The check valve body 61 includes a valve chamber 611 housing the valve body 63 in the inside, and an output side cylinder chamber 612. The output side cylinder chamber 612 and the valve chamber 611 are connected through an interconnecting passage 613, and the flow passage 613a is connected to the interconnecting passage 613. The flow passage 613a is connected to the other end of the flow path 89a. The flow passage 612a is connected to the output side cylinder chamber 612, and one end of the flow path 89d is connected to the flow passage 612a. The valve chamber 611 is connected to the flow passage 611a, and the flow passage 611a is connected to the other end of the flow path 89c.

Inside the valve chamber 611, a valve body 63 and a disk-shaped guide member 65 are housed. In the valve body 63, guide pins 631 and 632 are formed extending in the longitudinal direction along the axial direction (moving direction of the valve body, i.e. the flow direction of the oil), whereas the pin 631 at the rear end is slidably inserted into the guide hole 651 formed in the center of the guide member 65. In the guide member 65, a plurality of flow-through holes 652 are formed around the guide hole 651.

The pin 632 at the front end of the valve body 63 is slidably inserted into the insertion hole 642 formed at the tip of the piston rod 641 of the output side piston 64 (described later). The valve body 63 is guided so as to reciprocate on the axis by the guide hole 651 and the through-hole 642.

A convex taper is formed in the outer peripheral portion of the valve body 63, and a sealing member is further provided in the exterior. Therefore, it functions to close the valve port 611h by overlapping with the valve port 611h formed in the connecting part of valve chamber 63 and the flow passage 613. The valve port 611*h* has a configuration such that, since a recess taper having the inclination angle same as the convex taper of the valve body 63 is formed, the valve body 63 opens for a flow from the pressure actuators 8 to the moving amount actuator 9, and closes for a flow in the reverse direction by being pressed against the valve body 63 or the valve port 611*h*.

On the other hand, an output side piston 64 is housed in the output side cylinder chamber 612, and when the pressure inside the output side cylinder chamber 612 increases due to supply of the liquid from the flow passage 612*a*, the piston 64 moves in the direction of the valve body 63.

The output side cylinder chamber 612 is connected to the input side cylinder chamber 621 of the release member 60 through the flow path 89*d*.

Figure 13:
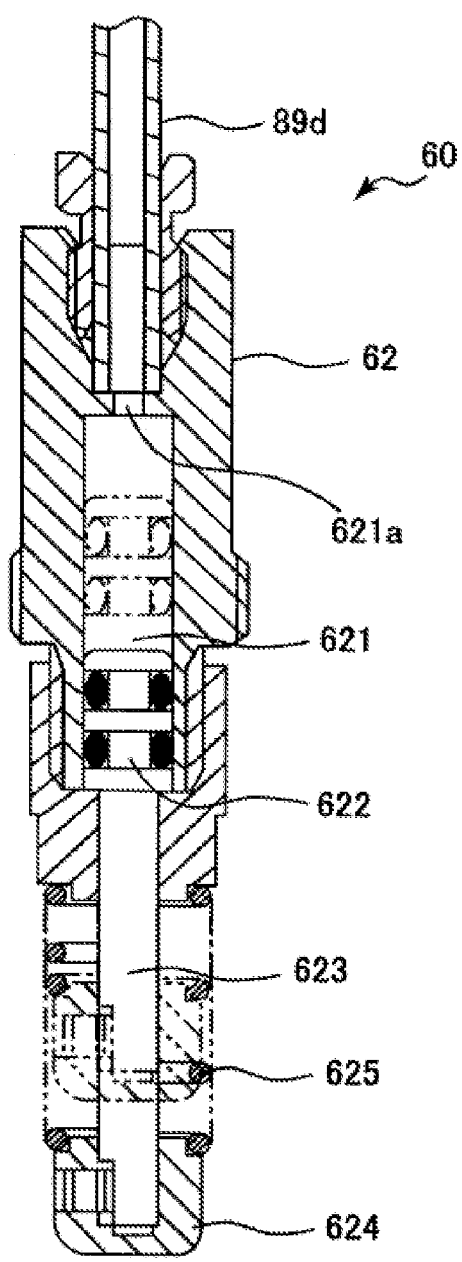
FIG. 13 is an overall cross-sectional side view of the release member.

The configuration of the release member 60 is described below with reference to FIG. 13. The input side cylinder chamber 621 is provided inside the cylinder body 62, and an input side piston 622 is housed in the input side cylinder chamber 621. The input side cylinder chamber 621 is connected to the other end of the flow path 89*d* via the flow passage 621*a*. The piston rod 623 of the input side piston 622 protrudes from the input side cylinder chamber 621 and functions as a detection member, and a tip of the piston rod 623 is provided with a contact member 624. A compressed spring 625 is inserted between the contact member 624 and the tip of the cylinder body 62. The piston rod 623 is biased in the direction of protrusion by the spring 625.

The cylinder body 62 is fixed on the outside of the side member 411*a*, and is disposed so as to project the piston rod 623 in the rear direction. The contact member 624 abuts the abutment surface 322*a* provided in the connecting part 321*a* of the swinging support member 32*a*.

The contact member 624 is in contact with the abutment surface 322*a* when in a standby state where the supporting member 3 is not inclined, and in this state, the piston rod 623 is in a state of having been pushed into the cylinder body 62 to a maximum extent. In other words, the volume inside the cylinder 621 is the least in the standby state. When the supporting member 3 swings in the direction of inclination, the abutment surface 322*a* moves away from the cylinder body 62, and the piston rod 623 is pulled outwards by the spring 625. Further, the flow paths 89*a*, 89*c*, and 89*d* constitute the pressure transmission member.

The relationship between the release member 60 and the disabling reverse transmission member 6 is explained below. When the piston rod 623 is pulled out by the action of the spring 625, and the input side piston 622 in the input side cylinder 621 moves in a direction of increasing the inner volume of the cylinder, oil is sucked up through the flow path 89*d*. With the sucking of the oil, the piston 64 inside the output side cylinder chamber 612 of the check valve body 61 moves in a direction away from the valve body 63 (the state shown in FIG. 11). Because this releases the contact of the piston rod 641 with the valve body 63, the valve body 63 is able to move in a direction to close the valve port 611*h*, and a flow of the oil from the displacement amount actuator 9 towards the pressure actuators 8 can be stopped.

On the other hand, when the swinging member 32*b* returns to the standby position, the abutment surface 322*a* pushes the contact member 624 and in turn pushes the piston rod 623, and oil is pushed out of the input side cylinder chamber 621 due to the movement of the input side piston 622. As a result, the piston 64 in the output side cylinder chamber 612 of the check valve body 61 moves toward the valve body 63, eventually pushes the valve body 63, separates the valve body 63 from the valve port 611*h* (the state shown in FIG. 12), and releases the reverse-disabled state.

In this configuration, a fluid is employed as a pressure transmitting medium, and therefore, by making the lateral cross-sectional area of the output side cylinder chamber 612 smaller than the lateral cross-sectional area of the input side cylinder chamber 621, the displacement amount of the output side piston 64 can be made larger than the displacement amount of the input side piston 622. And by detecting the return of the swinging member 32*b* to the standby position by the movement of the piston rod 623 of the input side piston 622, the valve body 63 can be moved reliably and the reverse-disabled state can be released.

Further, as a configuration of using the release member 60 to detect a return of the supporting member 3 as a displacement amount, and outputting the detection result as a displacement amount in the release direction of the valve body 63, apart from the case of using a fluid as described above, a wire or link mechanism may also be employed.

Figure 14:
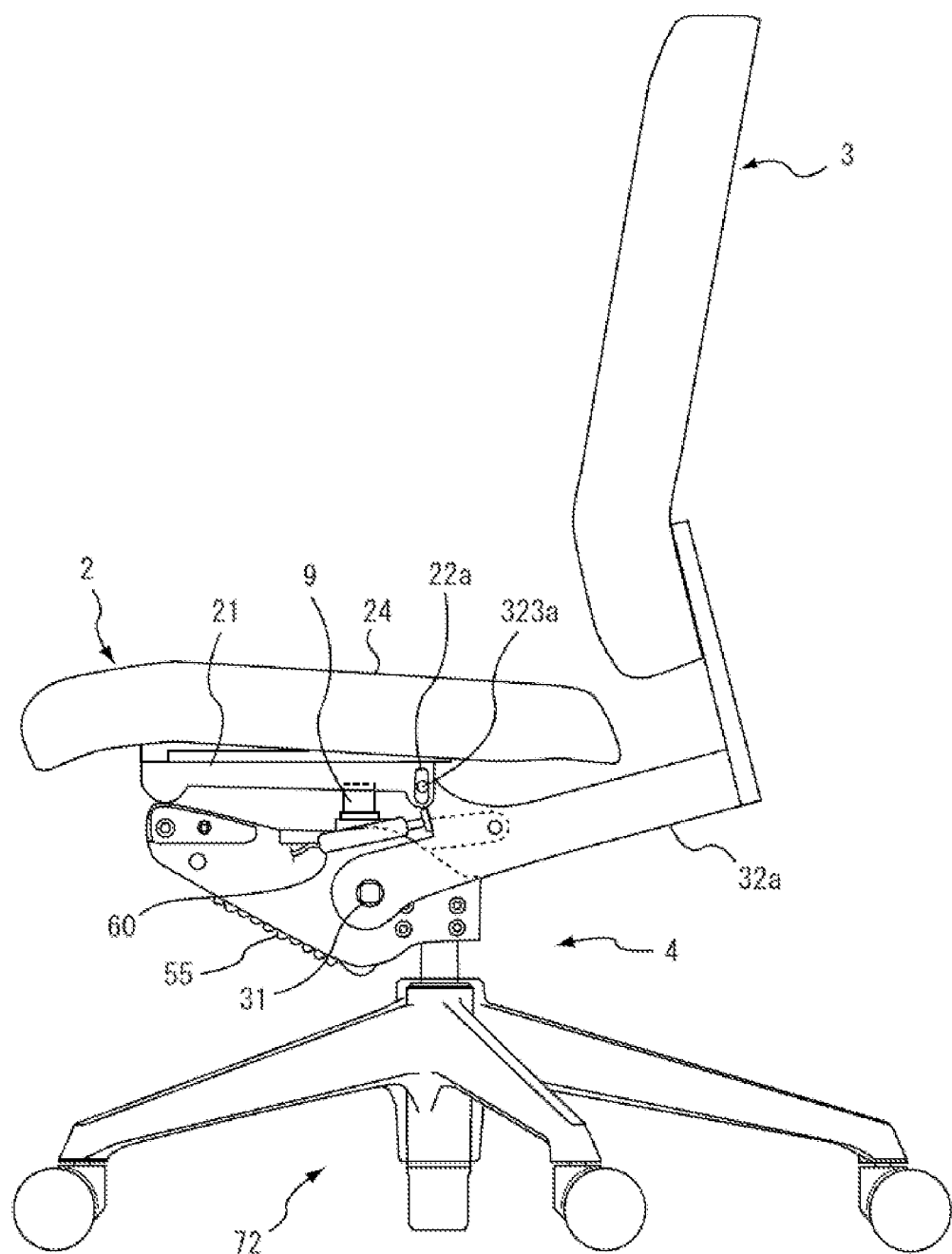
FIG. 14 is an overall side view of the posture holding apparatus with an object placed thereon.

The mechanism of the posture holding apparatus 1 of the present invention is described below. In the state where nothing is placed, the actuators 8 and 9 are in a standby state as shown in FIG. 1 and FIG. 3, and oil is filled on the side of the pressure actuator 8 and the piston rod of the displacement amount actuator 9 is in the most retracted state as shown in FIG. 9 and FIG. 8. When an object is loaded and weight is applied to the placing member 24, the base 2 sinks and the piston rod 822 of the pressure actuator 8 is pushed down as shown in FIG. 14.

As a result, the piston rod 922 of the displacement amount actuator 9 protrudes and pushes down the connection shaft 351. Due to this, the distance between the connection shaft 351 and the oscillating shaft 31 changes and becomes shortened.

In FIG. 4, a biasing force of the spring 55 against the swinging member 42 is acting in the left rotating direction (a direction of returning the supporting member 3 to the standby state). The point of action of the returning force with respect to the swinging support member 32 is the connection shaft 351. Because the position of this connection shaft 351 moves in a direction of approaching the oscillating shaft 31, a force for returning the swinging support members 32*a* and 32*b* becomes stronger than that in the standby state.

The returning force becomes stronger as the distance Lm between this connection shaft 351 and the oscillating shaft 31 decreases. Here, since the extent of projection of the piston rod 922 of the displacement amount actuator 9 increases as the weight of the placed object increases, the distance Lm decreases, and therefore, the heavier the weight, the stronger the returning force on the supporting member 3 becomes. That is, the strongest returning force is generated when the piston rod 922 projects the longest (distance L).

Figure 15:
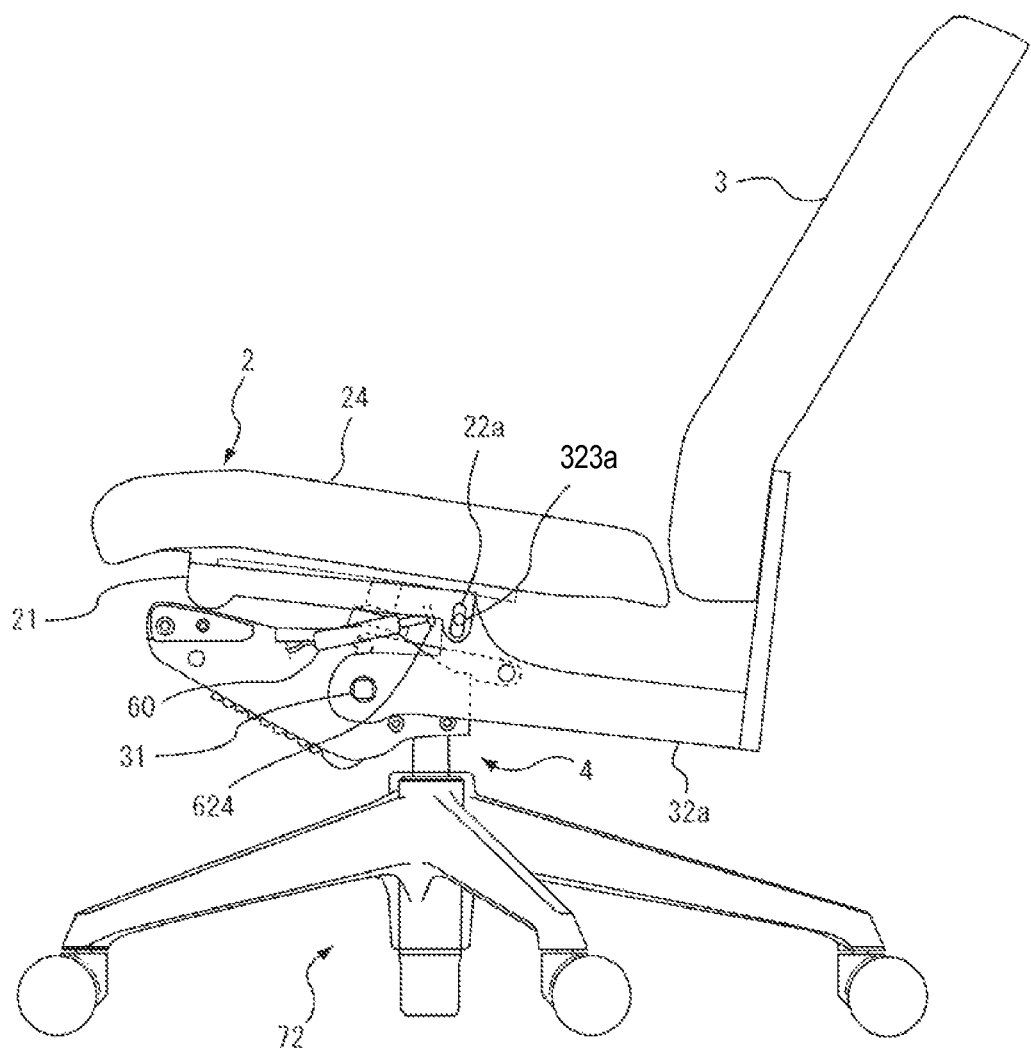
FIG. 15 is an overall side view of the posture holding apparatus depicting a state in which an object is placed and the supporting member is inclined.

Namely, as shown in FIG. 15, when the supporting member 3 is inclined and comes to an active state, a force of the supporting member 3 for supporting the posture of the placed object caused by the restoring force of the spring 55 would become stronger as the weight increases.

Also, here, the release member 60 is in a state where the piston rod 623 is in a protruded state and the disabling reverse transmission member is acting. When the supporting member 3 returns to the standby state upon removing the object, the piston rod 623 is pushed back and the reverse flow restriction of the disabling reverse transmission member is released, and therefore, oil flows back from the displacement amount actuator 9 to the pressure actuator 8 due to a returning force of the coiled spring 311, and the initial state is restored.

What is claimed is:

1. A posture holding chair comprising:
   a base onto which a substance is placed;
   a supporting member which is attached onto the base so that the supporting member freely swings centering on a pivot between a standby state where the supporting member does not support the substance and an active state where the supporting member supports the substance in an inclination state, the supporting member being positioned on a side of the base; and
   a swinging support member having a returning force for returning the supporting member to the standby state when the supporting member is inclined;
   wherein the swinging support member is structured by
   a swinging member that is supported on an oscillating shaft so as to freely rotate with respect to the oscillating shaft and that swings in conjunction with the supporting member,
   a biasing member for applying a biasing force to the swinging member in a direction of return of the supporting member to the standby state,
   a liquid pressure output member for outputting a liquid pressure in response to a weight of the substance placed on the base, the liquid pressure output member being positioned under the base;
   a displacement amount adjusting member, with which a point of action of the biasing force applied from the biasing member to the supporting member is moved in response to a liquid pressure outputted from the liquid pressure output member such that a distance from the oscillating shaft of the swinging member to the point of action changes; and
   a connecting member that bridges between the swinging member and the supporting member, and synchronizes the swinging member and the supporting member;
   wherein
   the biasing member is connected to a lower side of the swinging member with respect to the oscillating shaft,
   a long hole lengthwise in a vertical direction is formed on an upper side of the swinging member with respect to the oscillating shaft,
   a connection shaft is located in the long hole,
   the connection member is connected with the connection shaft,
   the point of action is the connection shaft,
   a coil spring is wound around the oscillating shaft,
   a fixed end of the coil spring is fixed to the swinging member, and
   a working end of the coil spring abuts the connection shaft and biases the connection shaft in a direction away from the oscillating shaft.

2. The posture holding chair according to claim 1, wherein the displacement amount adjusting member includes:
   a moving member capable of varying a distance between the connection shaft and the oscillating shaft of the swinging member by reciprocating motion; and
   an actuator for adjusting a displacement amount of the moving member according to a liquid pressure outputted from the liquid pressure output member.

3. The posture holding chair according to claim 1 further comprising:
   a pressure transmission member for transmitting a liquid pressure from the liquid pressure output member to the displacement amount adjusting member; and
   a disabling reverse transmission member provided in the pressure transmission member, the disabling reverse transmission member enabling a pressure transmission direction of the pressure transmitting medium from the liquid pressure outputting member to the displacement amount adjusting member, and disabling transmission from the displacement amount adjusting member to the liquid pressure outputting member.

4. The posture holding chair according to claim 3 further comprising:
   a release member for releasing regulations of a pressure transmission direction of the disabling reverse transmission member when the supporting member returns to the standby state.

5. The posture holding chair according to claim 2, wherein the connection shaft is capable of moving along the long hole.

6. The posture holding chair according to claim 5, further comprising:
   a positioning member provided with a positioning hole formed at a position corresponding to a position of the long hole, the positioning member being provided over the swinging member;
   a plurality of recessed parts provided along a movement direction of the connection shaft in an inner perimeter of the positioning hole, the plurality of recessed parts being capable of engaging with the connection shaft; and
   a pressing biasing member to bias the positioning member so that the recessed parts are pressed onto the connection shaft.

* * * * *